(12) United States Patent
Park

(10) Patent No.: US 11,433,345 B2
(45) Date of Patent: Sep. 6, 2022

(54) AIR-CONDITIONING DEVICE HAVING DUST REMOVING FUNCTION

(71) Applicant: CENDORI CO., LTD., Gwangju (KR)

(72) Inventor: Moon Soo Park, Gwangju (KR)

(73) Assignee: CENDORI CO., LTD., Gwangju (KR)

( * ) Notice: Subject to any disclaimer, the term of this patent is extended or adjusted under 35 U.S.C. 154(b) by 379 days.

(21) Appl. No.: 16/619,377

(22) PCT Filed: Jun. 26, 2018

(86) PCT No.: PCT/KR2018/007228
§ 371 (c)(1),
(2) Date: Dec. 4, 2019

(87) PCT Pub. No.: WO2019/004700
PCT Pub. Date: Jan. 3, 2019

(65) Prior Publication Data
US 2020/0155992 A1   May 21, 2020

(30) Foreign Application Priority Data

Jun. 26, 2017 (KR) .......................... 10-2017-0080256

(51) Int. Cl.
*B01D 46/00* (2022.01)
*B01D 46/10* (2006.01)
(Continued)

(52) U.S. Cl.
CPC ....... *B01D 46/681* (2022.01); *B01D 46/0043* (2013.01); *B01D 46/10* (2013.01);
(Continued)

(58) Field of Classification Search
CPC ........ B01D 46/10; B01D 46/70; B01D 46/88; B01D 46/681; B01D 2279/50; F24F 8/10;
(Continued)

(56) References Cited

U.S. PATENT DOCUMENTS 8,647,404 B2 * 2/2014 Yumoto ................ F24F 1/0073
55/471
8,734,553 B2 * 5/2014 Sakashita ............... F24F 13/28
55/296
(Continued)

FOREIGN PATENT DOCUMENTS

JP   11-309321 A   11/1999
JP   2012-032071 A   2/2012
(Continued)

*Primary Examiner* — Minh Chau T Pham
(74) *Attorney, Agent, or Firm* — Novick, Kim & Lee, PLLC; Jae Youn Kim

(57) ABSTRACT

An air-conditioning device has a dust removing function, including: an outdoor air introducing portion for introducing outdoor air into a case; an outdoor air discharge portion having a blowing fan for supplying the indoor environment with the outdoor air introduced through the outdoor air introducing portion; an indoor air introducing portion for introducing indoor air; and an indoor air discharge portion having a blowing fan for discharging the indoor air introduced through the indoor air introducing portion into the outdoor environment, wherein the air-conditioning device includes: a filter coupled inside the entrance of the outdoor
(Continued)

air introducing portion to be able to collect dust that is introduced together with outdoor air; and an opening formed through the lower end of the edge portion of the filter.

2 Claims, 8 Drawing Sheets

(51) Int. Cl.
*B01D 46/681* (2022.01)
*F24F 8/10* (2021.01)
*F24F 8/90* (2021.01)
*F24F 13/28* (2006.01)
*F24F 12/00* (2006.01)
*F24F 13/24* (2006.01)

(52) U.S. Cl.
CPC ............... *F24F 8/10* (2021.01); *F24F 13/28* (2013.01); *B01D 2279/50* (2013.01); *F24F 8/90* (2021.01); *F24F 12/006* (2013.01); *F24F 13/24* (2013.01); *F24F 2221/22* (2013.01)

(58) Field of Classification Search
CPC .. F24F 8/90; F24F 12/006; F24F 13/10; F24F 13/14; F24F 13/30; F24F 2221/22
USPC ...... 55/282–305, 385.1–385.7, 410.1, 418.1, 55/428–433, 467.1; 165/95, 303, 165/DIG. 11, DIG. 85, 4–10, 59, 104.34, 165/DIG. 10; 62/303, 4–10, 59, 95, 62/104.34, DIG. 10, DIG. 11, DIG. 85
See application file for complete search history.

(56) References Cited

U.S. PATENT DOCUMENTS

| | | | |
|---|---|---|---|
| 2006/0070358 A1* | 4/2006 | Oda | F24F 1/0063 55/471 |
| 2006/0096459 A1* | 5/2006 | Iwano | F24F 8/10 55/296 |
| 2009/0183471 A1* | 7/2009 | Shibuya | B01D 46/681 55/282.2 |
| 2009/0193769 A1* | 8/2009 | Mun | F24F 8/10 55/289 |
| 2010/0107575 A1* | 5/2010 | Zhang | F24F 1/0071 55/289 |
| 2010/0294134 A1* | 11/2010 | Yokomizo | B01D 46/10 96/405 |
| 2011/0011259 A1* | 1/2011 | Demonie | B01D 46/70 95/1 |
| 2011/0120066 A1* | 5/2011 | Sakashita | B01D 46/10 55/282.2 |
| 2012/0180665 A1* | 7/2012 | Jeong | F24F 1/0047 55/289 |
| 2014/0216251 A1* | 8/2014 | Jun | F24F 8/10 95/26 |

FOREIGN PATENT DOCUMENTS

| | | |
|---|---|---|
| KR | 10-0343036 B1 | 7/2002 |
| KR | 20-0340918 Y1 | 2/2004 |
| KR | 10-0802021 B1 | 2/2008 |
| KR | 10-2009-0060601 A | 6/2009 |
| KR | 10-1471074 B1 | 12/2014 |

* cited by examiner

AIR-CONDITIONING DEVICE HAVING DUST REMOVING FUNCTION

TECHNICAL FIELD

The present invention relates to an air-conditioning device having a dust removal function, and more particularly to an air-conditioning device for collecting and removing dust from air introduced through an outdoor air suction hole formed in the air-conditioning device and for removing dust from a filter installed on a side surface of a heat exchanger of the air-conditioning device using backwashing air, thereby exhibiting an intrinsic dust removal function of removing dust (including foreign substances) without requiring a user to directly clean or replace the dusty filter, preventing the occurrence of noise and deterioration in air-conditioning efficiency due to clogging of the filter, minimizing the introduction of dust into an indoor space, and thus keeping the air in the indoor space pure.

BACKGROUND ART

In general, for recently constructed buildings, great effort is spent on insulation to save energy and very great attention is spent on ventilation for health.

Therefore, in order to satisfy requirements for both insulation and ventilation, an air-conditioning device for buildings is used to forcibly suction and discharge indoor air and outdoor air through a ventilation fan and to purify air and save energy using a filter or a heat exchanger. The foregoing air-conditioning device for buildings is usually installed on the ceiling for efficient utilization of space, and serves to suction and discharge indoor air and outdoor air through a duct. Of course, the foregoing air-conditioning device may be configured to have a cooling function (an air conditioner) and a heating function (a fan heater).

A conventional air-conditioning device equipped with a dust-collector, as shown in FIG. 1, includes a suction hole formed in one side surface of a case to suction outdoor air therethrough, a heat exchanger including a means for cooling or heating the outdoor air using the difference in temperature between the outdoor air suctioned through the suction hole and indoor air, an outdoor air supply fan configured to supply the outdoor air that has passed through the heat exchanger to an indoor space, an air supply hole through which the outdoor air is introduced into the indoor space by the air supply fan, an indoor air suction hole formed in the side opposite the suction hole, formed to suction the outdoor air, in order to discharge the indoor air therethrough, an indoor air blowing fan configured to cause the indoor air discharged through the suction hole to pass through the heat exchanger and to be discharged to the outside, and an indoor air discharge hole through which the indoor air is discharged to the outside by the blowing fan. This heat-exchange-type air-conditioning device has structures that are installed inside the case thereof in order to adsorb and process viruses, bacteria, emissions, dust, and the like contained in outdoor air suctioned into the indoor space, the structures including a pre-filter formed in a fiber mat type to collect substances having large particles such as large dust, an ionizer for electrically charging fine dust particles introduced through the pre-filter, a collector for collecting the fine dust particles, which have been electrically charged by the ionizer, using an electrostatic phenomenon, and a deodorization filter for removing odors from the air from which fine dust particles have been removed by the collector.

However, the conventional air-conditioning device described above is configured such that the filter is installed on a side surface of the heat exchanger in order to remove only dust introduced into the heat exchanger, which is inconvenient because a user needs to directly clean or replace the filter at regular intervals.

In addition, the presence of filtered dust in the filter means that dust has already been introduced into the air-conditioning device, that is, means that the interior of the air-conditioning device is already dirty.

In addition, the conventional air-conditioning device has no means for interrupting the introduction of dust into the air-conditioning device or for sweeping or removing dust collected in the filter, and thus dust collects in the air-conditioning device, which deteriorates air-conditioning efficiency, causes the occurrence of noise due to clogging of the filter, deteriorates air-blowing ability, and consequently leads to contamination of indoor air.

RELATED ART DOCUMENTS

1. Korean Patent Registration No. 10-1471074
2. Korean Patent Registration No. 10-0343036

DISCLOSURE

Technical Problem

It is an object of the present invention for solving the above-described problems to provide an air-conditioning device for blocking dust contained in outdoor air introduced into the air-conditioning device in advance before the dust is filtered by a filter installed on a side surface of a heat exchanger, thereby minimizing the introduction of dust into the air-conditioning device, and for continuously removing dust collected in the filter installed on the side surface of the heat exchanger using backwashing air, thereby improving the dust-collecting efficiency and air-conditioning efficiency of the air-conditioning device, exhibiting an intrinsic dust removal function of removing dust (including foreign substances) without requiring a user to directly clean or replace the dusty filter, increasing convenience of use, maintaining the purified state of indoor air at the highest level through minimization of introduction of dust along with outdoor air and cleanliness of the interior of the air-conditioning device, and thus providing a healthy life to users.

Technical Solution

In accordance with the present invention, the above objects can be accomplished by the provision of an air-conditioning device having a dust removal function, the air-conditioning device including an outdoor air introduction unit configured to introduce outdoor air into a case, an outdoor air discharge unit including a blowing fan configured to supply outdoor air introduced through the outdoor air introduction unit to an indoor space, an indoor air introduction unit configured to introduce indoor air, an indoor air discharge unit including a blowing fan configured to discharge indoor air introduced through the indoor air introduction unit to the outside, a filter coupled to an inner side of an inlet of the outdoor air introduction unit to collect dust introduced along with outdoor air, an opening formed in the lower end of a flange of the filter, a dust-sweeping unit coupled to one side of the filter to sweep dust adhered to an inner surface of the filter, and a dust discharge pipe including one end connected to the opening in the filter and an opposite end connected to the blowing fan installed in the indoor air discharge unit, the dust discharge pipe being provided at a middle portion thereof with a valve equipped with a motor so as to be opened and closed.

According to the embodiment of the present invention, the dust-sweeping unit includes a flange, a frame extending from the flange to allow a motor to be installed thereto, a dust-collecting net attached to the frame, and a brush configured to be in close contact with the dust-collecting net and to be rotated by the motor.

According to the embodiment of the present invention, the dust-collecting net includes a slit in which a concave groove portion is coupled, and the lower end of the concave groove portion communicates with the opening such that dust swept by the brush is discharged through the opening via the concave groove portion.

According to the embodiment of the present invention, dampers are provided at inlets of the outdoor air introduction unit, the outdoor air discharge unit, the indoor air introduction unit, and the indoor air discharge unit such that a filter installed on a side surface of a heat exchanger is cleaned using backwashing air.

Advantageous Effects

The present invention described above has an effect of blocking dust contained in outdoor air introduced into the air-conditioning device in advance before the dust is filtered by a filter installed on a side surface of a heat exchanger, thereby minimizing the introduction of dust into the air-conditioning device.

In addition, the present invention exhibits an intrinsic dust removal function of discharging dust (including foreign substances) to the outside of the air-conditioning device without requiring a user to directly clean or replace a dusty filter, thereby continuously removing the collected dust, improving the dust-collecting efficiency of a dust collector, and minimizing the re-introduction of dust into the air-conditioning device.

In addition, the present invention is a very useful invention that is capable of removing the dust filtered by a filter installed on a side surface of a heat exchanger using backwashing air, thereby preventing deterioration in air-conditioning efficiency, keeping the interior of the air-conditioning device clean at all times, reducing noise due to clogging of the filter, improving air-blowing performance, minimizing the introduction of dust from the interior of the air-conditioning device into an indoor space, and thus enabling users to live healthy lives without concern about dust.

BEST MODE

Figure 1:
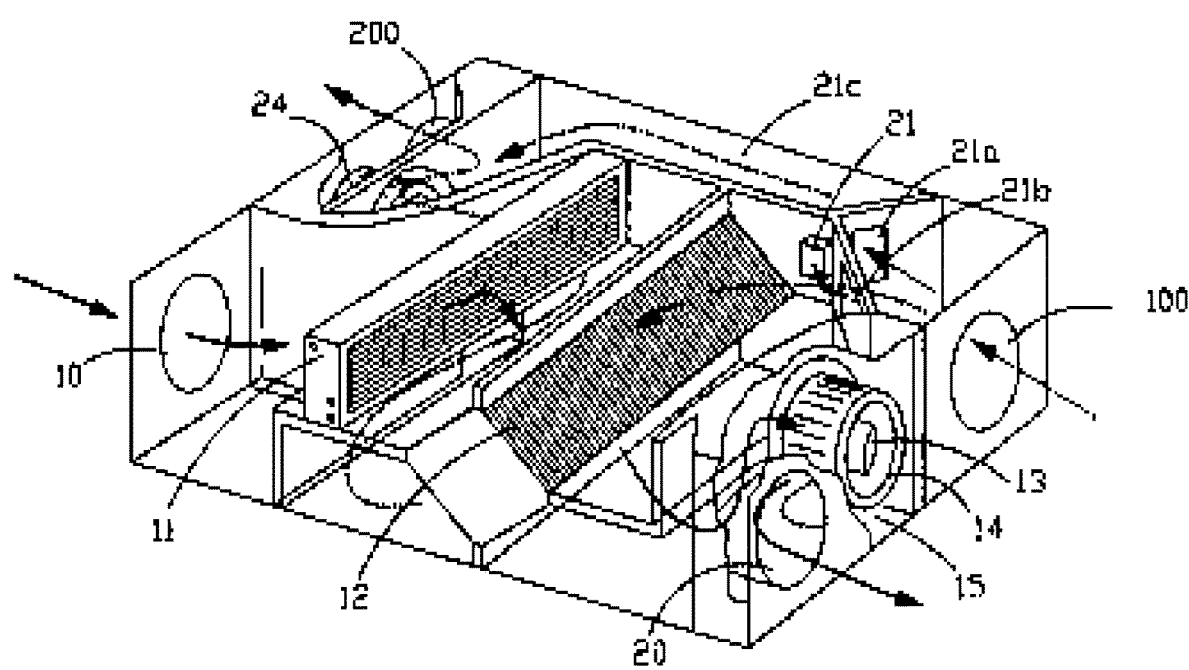
FIG. 1 is a schematic constitutional view of a conventional air-conditioning device.

Hereinafter, embodiments of the present invention will be described in detail with reference to the accompanying drawings so that those skilled in the art can easily carry out the embodiments. The present invention may, however, be embodied in many different forms, and should not be construed as being limited to the embodiments set forth herein. The terminology used herein is for the purpose of describing particular embodiments only and is not intended to be limiting of the disclosure. As used herein, the singular forms are intended to include the plural forms as well, unless the context clearly indicates otherwise. It will be further understood that the term "include", when used in this specification, specifies the presence of stated features, regions, integers, steps, operations, elements, and/or components, but does not preclude the presence or addition of other features, regions, integers, steps, operations, elements, components, and/or groups thereof. Unless otherwise defined, all terms used herein, which include technical terms and scientific terms, have the same meanings as those generally appreciated by those skilled in the art to which this invention pertains. Terms such as those defined in common dictionaries should be interpreted as having the same meanings as terms in the context of pertinent technology, and should not be interpreted as having ideal or formal meanings unless clearly defined in the specification.

The embodiments of the present invention described with reference to perspective views concretely represent ideal embodiments of the present invention. Consequently, illustrations are expected to be variously modified, for example, manufacturing methods and/or specifications are expected to be modified. Thus, the embodiments are not limited to a particular form of illustrated regions and, for example, modifications of forms according to manufacturing are also included. For example, a region illustrated or described as being flat may generally be rough or may have rough and nonlinear characteristics. In addition, a portion illustrated as having a sharp corner may be rounded. Thus, regions illustrated in the drawings are merely rough and broad, and their forms are not meant to be illustrated precisely nor meant to narrow the scope of the present invention.

MODE FOR INVENTION

Hereinafter, preferred embodiments of an air-conditioning device having a dust removal function according to the present invention will be described in detail with reference to the accompanying drawings.

Figure 2:
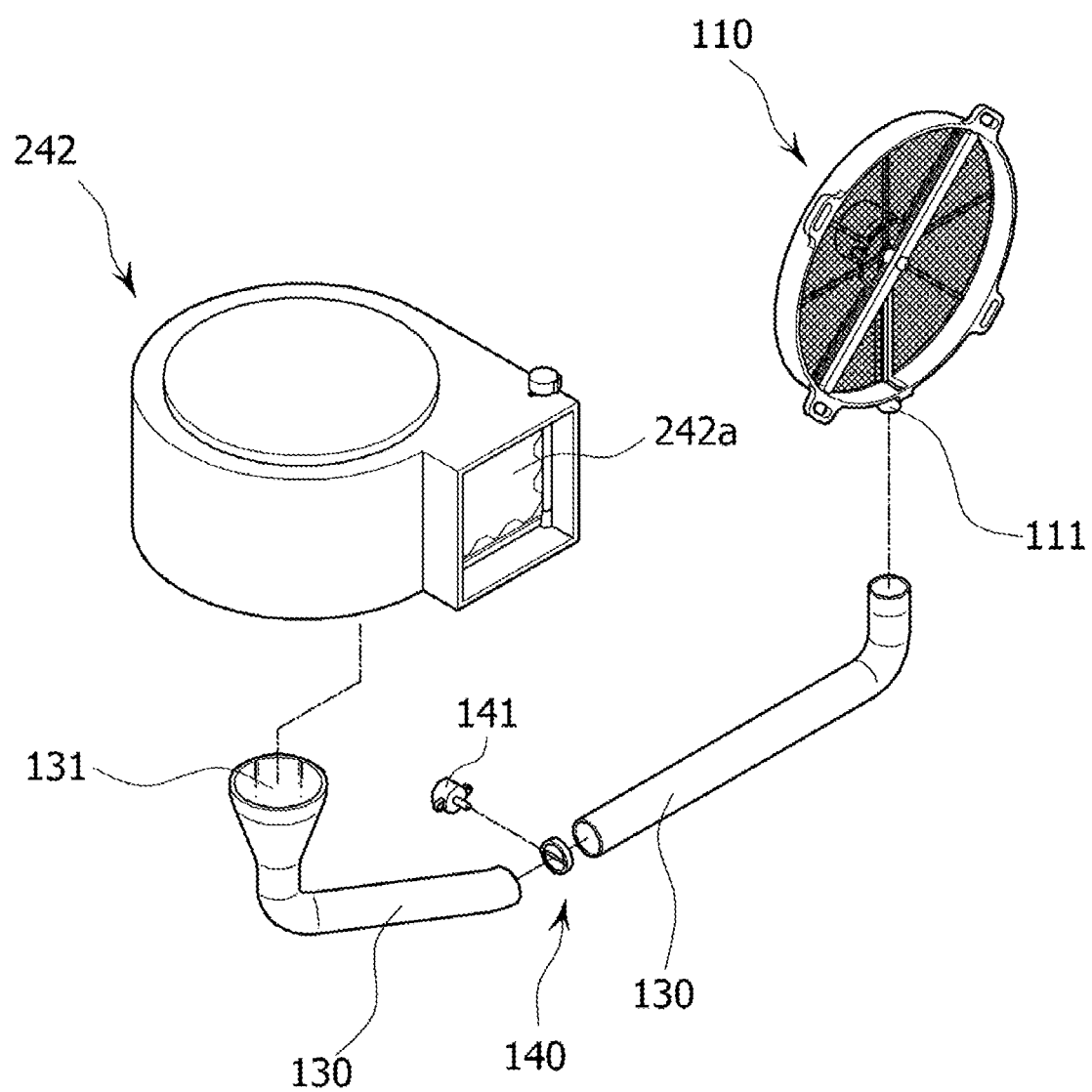
FIG. 2 is an exploded perspective view of an air-conditioning device having a dust removal function according to the present invention.
Figure 3:
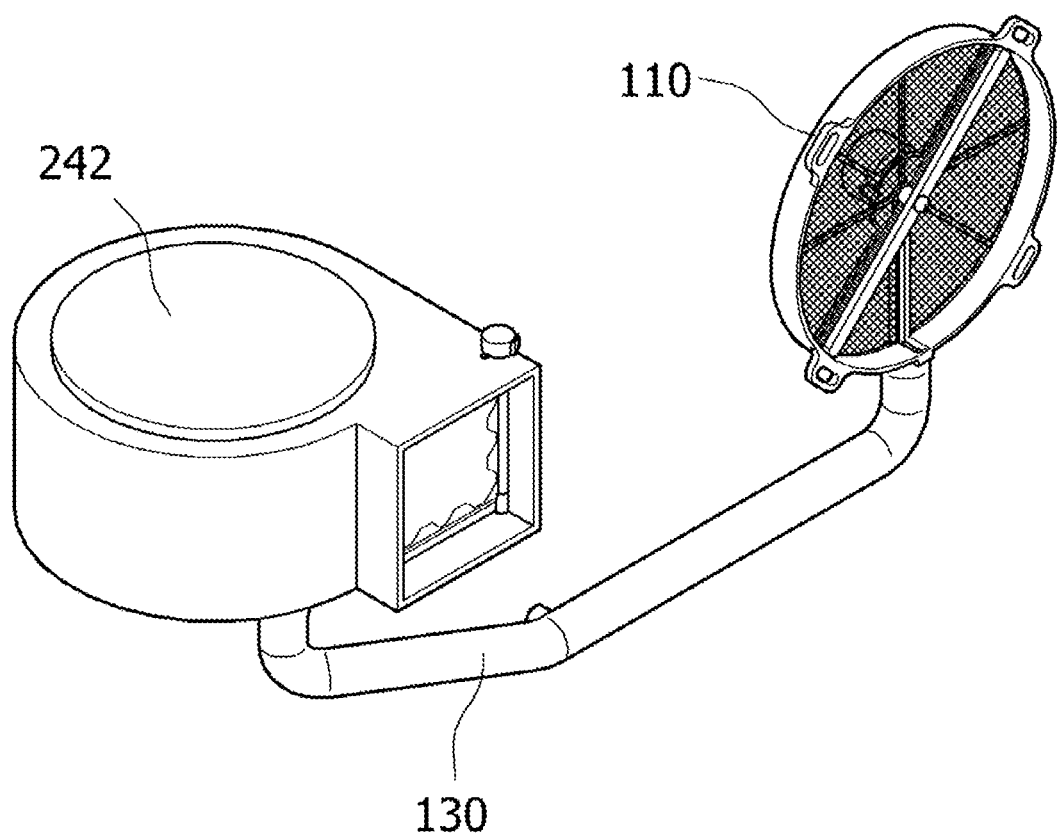
FIG. 3 is a perspective view of the coupled state of FIG. 2.
Figure 4:
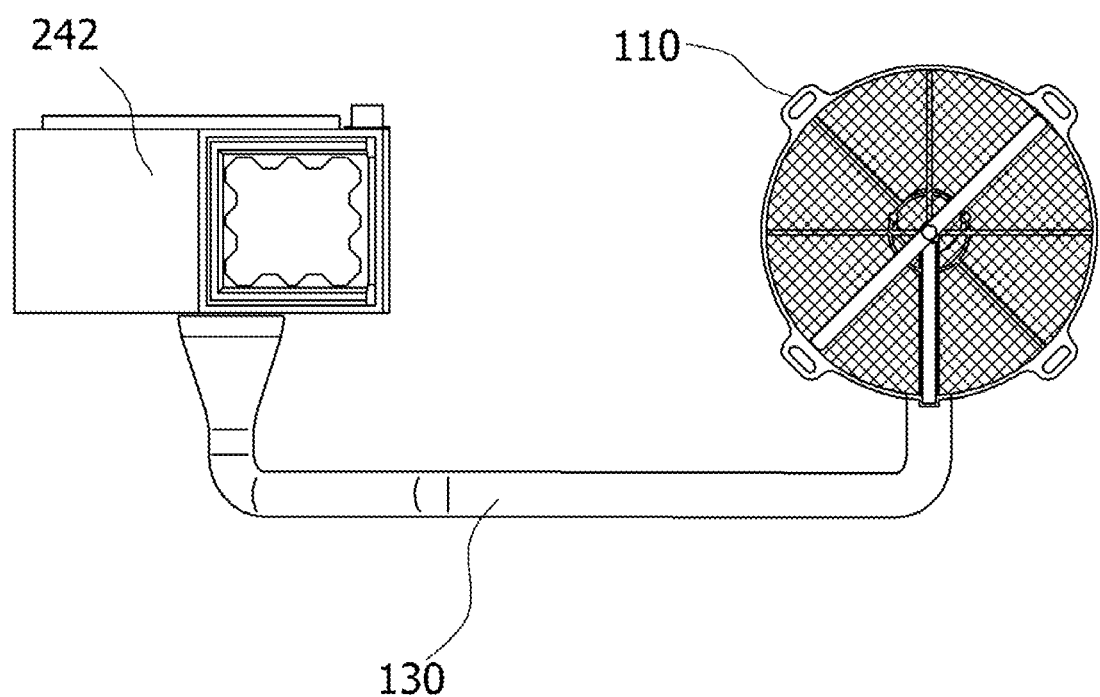
FIG. 4 is a front view of FIG. 3.
Figure 5:
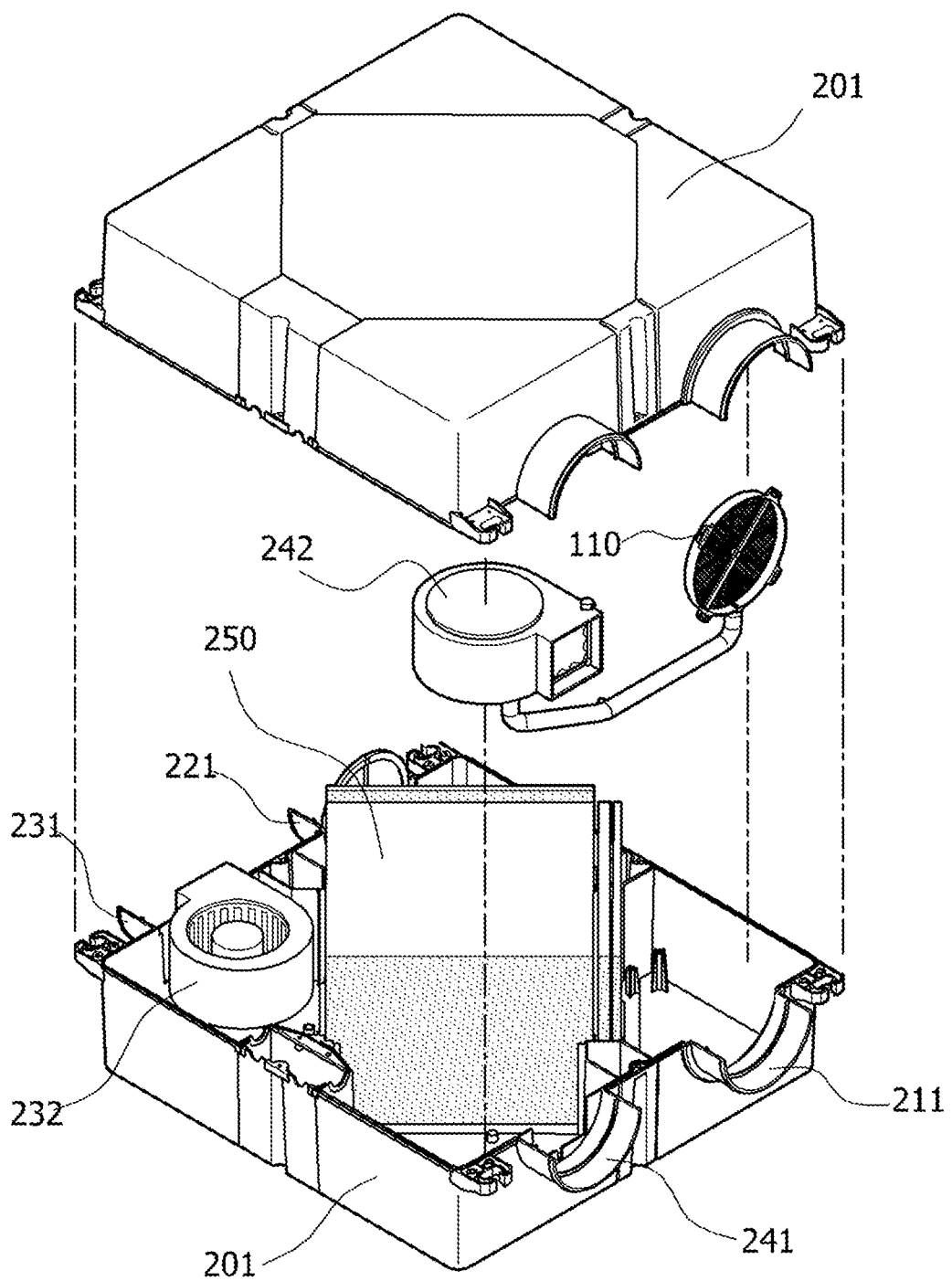
FIG. 5 is a reference view showing the state in which the present invention is used.
Figure 6:
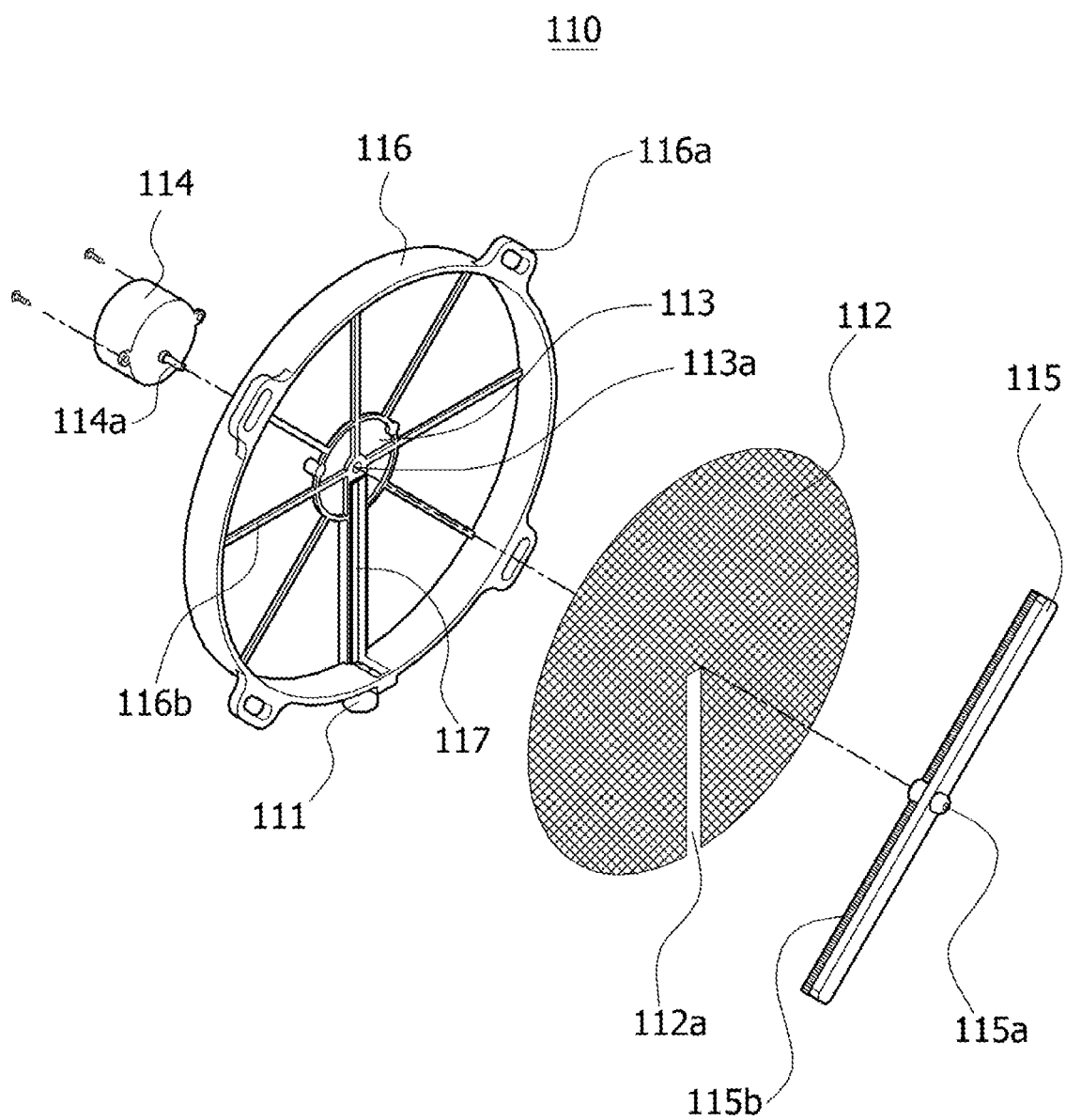
FIG. 6 is a perspective view showing another embodiment of the filter according to the present invention.
Figure 7:
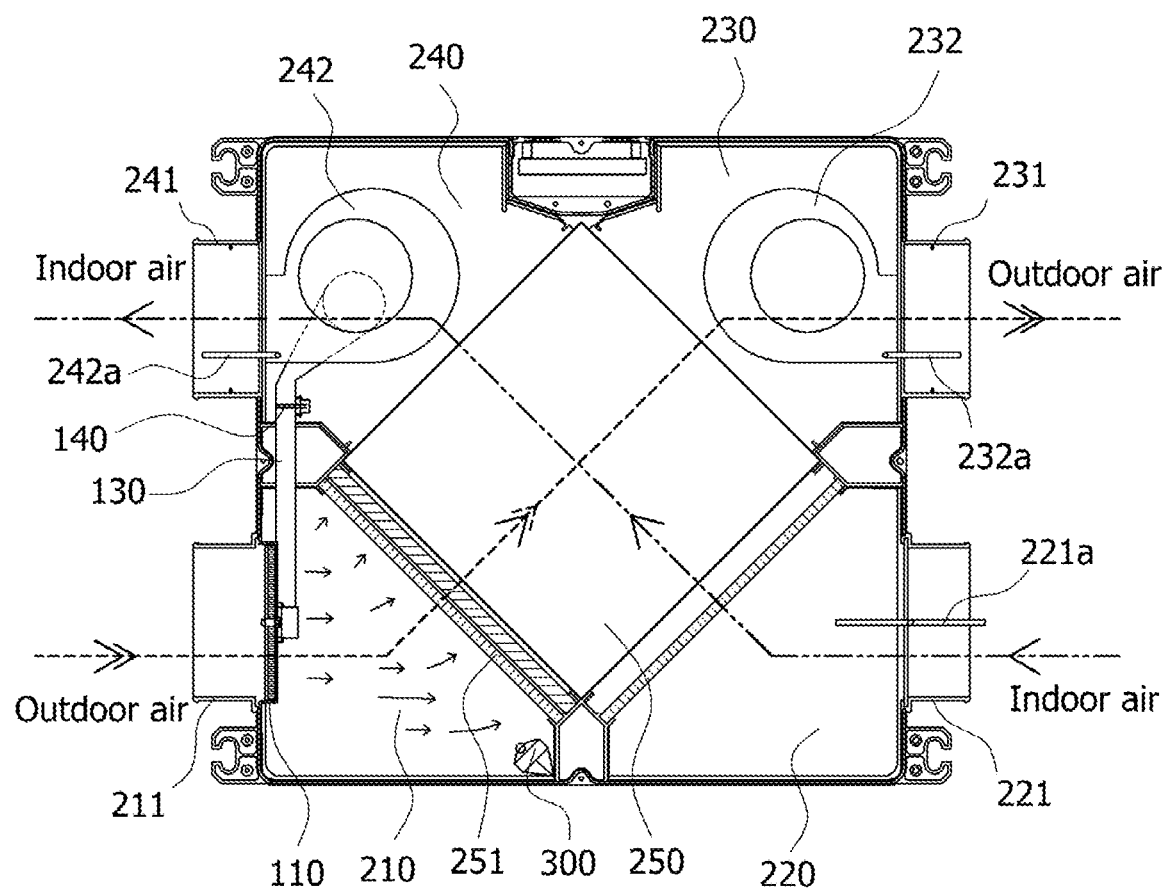
FIG. 7 is a view showing the state of collecting dust contained in outdoor air by the present invention.
Figure 8:
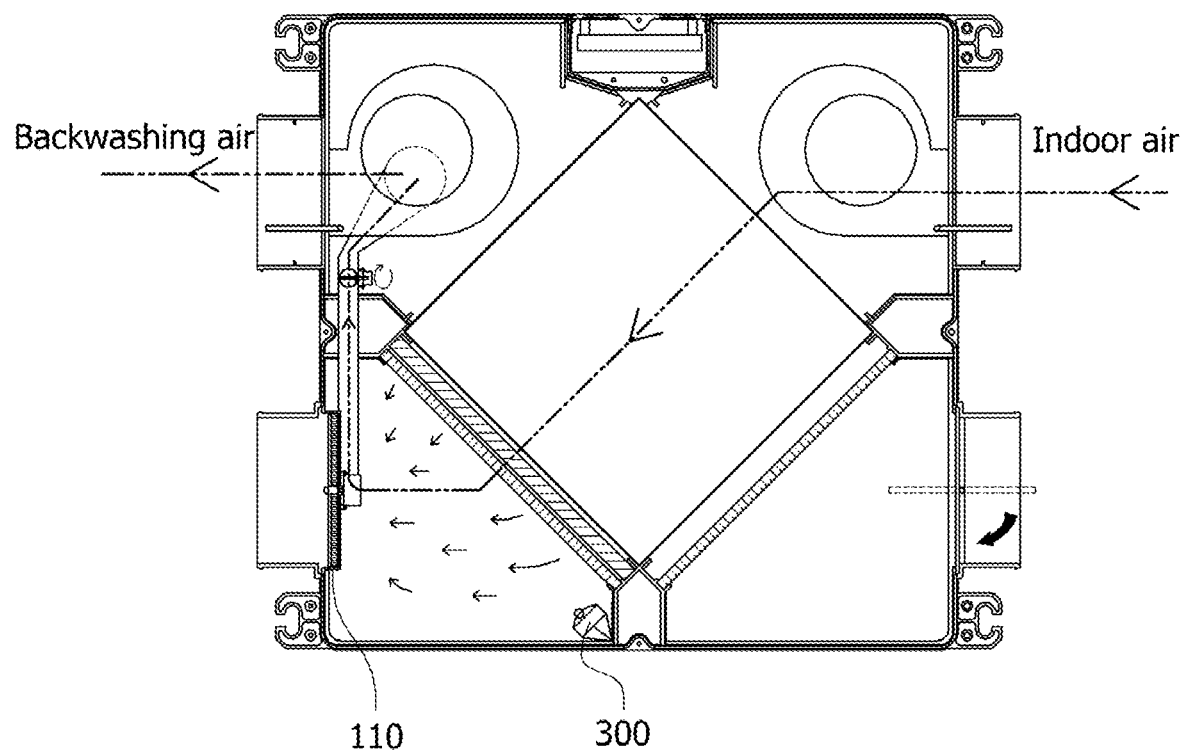
FIG. 8 is a reference view for explaining the state in which a filter installed on a side surface of a heat exchanger is cleaned using backwashing air according to the present invention.

FIG. 2 is an exploded perspective view of an air-conditioning device having a dust removal function according to the present invention, FIG. 3 is a perspective view of the coupled state of FIG. 2, FIG. 4 is a front view of FIG. 3, FIG. 5 is a reference view showing the state in which the present invention is used, FIG. 6 is a perspective view showing another embodiment of the filter according to the present invention, FIG. 7 is a view showing the state of collecting dust contained in outdoor air by the present invention, and FIG. 8 is a reference view for explaining the state in which a filter installed on a side surface of a heat exchanger is cleaned using backwashing air according to the present invention.

First, it should be noted that the same components or parts are denoted by the same reference numerals throughout the drawings wherever possible. In addition, in the following description of the present invention, a detailed description of known functions or known configurations incorporated herein will be omitted when it may make the subject matter of the present invention rather unclear.

An air-conditioning device having a dust removal function according to an embodiment of the present invention includes a heat exchanger 250 provided in a case 201, an outdoor air introduction unit 210 for introducing outdoor air, an outdoor air discharge unit 230 including a discharge fan 232 for supplying the outdoor air introduced through the outdoor air introduction unit 210 to an indoor space, an indoor air introduction unit 220 for introducing indoor air, and an indoor air discharge unit 240 including a blowing fan 242 for discharging the indoor air introduced through the indoor air introduction unit 220 to the outside. This air-conditioning device has a function of blocking dust introduced into the air-conditioning device before the dust enters the case 201 of the air-conditioning device or removing dust filtered by a filter installed on a side surface of the heat exchanger 250, that is, a side filter 251, using backwashing air.

The air-conditioning device having a dust removal function described above includes a filter 110 coupled to one side of an inlet 211 of the outdoor air introduction unit 210 in order to collect dust (including foreign substances) introduced along with the outdoor air, an opening 111 formed in the lower end of the filter 110, a dust-sweeping unit coupled to one side of the filter 110 in order to sweep dust adhered to the inner surface of the filter 110, a dust discharge pipe 130, one end of which is connected to the opening 111 and the opposite end of which is connected to the blowing fan 242 installed in the indoor air discharge unit 240, and a valve 140 provided in the middle of the dust discharge pipe 130 and equipped with a motor 141 in order to open and close the dust discharge pipe 130.

In this case, the dust-sweeping unit includes a motor 114, provided at the opposite side of the filter 110, and a brush 115, coupled to a shaft 114a of the motor 114 so as to be rotatable to sweep dust adhered to the inner surface of the filter 110.

The brush 115 includes a shaft-coupling hub 115a provided at one end thereof to allow the shaft of the motor 114 to be coupled thereto, and a support body extending from the shaft-coupling hub 115a and formed of a metal or synthetic resin material. The support body is provided at one side thereof with a dusting member 115b configured to effectively sweep dust adhered to the inner surface of the filter 110 without damaging the filter 110. The dusting member 115b may be made of a mohair material, or may be implemented as a soft resin plate, silicon plate, rubber plate, metal plate, etc.

In addition, it is preferable for the brush 115 to be manufactured in the same shape as the cross-sectional shape of the overall inner surface of the filter 110 so as to sweep dust while rotating in contact with the inner surface of the filter 110.

A dust-collecting net 112 used in the present invention is made of a very hard material, and functions as a filter and a support body. For example, the dust-collecting net may be implemented as a cylindrical body that has a plurality of through-holes formed therein and is made of a plastic material. Alternatively, the dust-collecting net may be manufactured to have a metallic net or plastic net structure, or may be manufactured such that a metallic or synthetic resin frame is covered with a filtering cloth.

It is preferable that a motor-seating part 113, which has a through-hole 113a through which the motor shaft 114a passes to secure stable coupling of the motor 114, be provided on the opposite side of the dust-collecting net 112. The motor-seating part 113 is a part required to stably support the motor 114, which has a specific size and weight. Preferably, the motor-seating part 113 is installed so as to be supported by a plurality of motor-supporting ribs 116b extending from a flange 116.

In this case, the dust-collecting net 112 has a slit 112a formed therein, and a concave groove portion 117 is coupled in the slit 112a. In this case, the concave groove portion 117 has a structure that is exposed toward the brush 115, and the lower end of the concave groove portion 117 communicates with the opening 111 so that the dust swept by the brush 115 is discharged through the opening 111 via the concave groove portion 117.

The opening 111 in the filter 110 is an element for discharging dust, collected on the inner surface of the filter 110 after being filtered thereby, to the outside of the dust collector for the air-conditioning device when the brush 115 sweeps the dust, and is preferably formed in the lower end of the filter 110 in order to facilitate the discharge of the dust.

In addition, the dust discharge pipe 130 is required to discharge the dust to the outside of the dust collector for the air-conditioning device. The valve 140 equipped with the motor 141 is provided in the middle of the dust discharge pipe 130 in order to allow or interrupt the flow of air through the dust discharge pipe 130 as needed.

In this case, the opposite end of the dust discharge pipe 130 may be directly connected to the blowing fan 242, and may be in close contact with an air suction hole in the blowing fan 242 in order to suction dust using the suctioning pressure of the blowing fan 242.

The filter 110 may be provided at a portion thereof with a flange 116, which has a coupling member so as to be coupled to a portion of the inlet 211 of the outdoor air introduction unit 210 of the air-conditioning device. In the case in which the coupling is performed using a screw, the coupling member formed at the flange 116 may be configured as a screw hole 116a into which the screw is fastened, and in the case in which a circular-shaped connecting protrusion is formed at the inner side of the outdoor air introduction unit, the coupling member formed at the flange may be configured to be coupled thereto in an interference-fit manner. Alternatively, the coupling member formed at the flange and the inlet of the outdoor air introduction unit may be coupled to and locked by each other using known coupling and locking devices, or may be threadedly engaged with each other using spiral threads formed therein. Of course, various other well-known coupling devices may be used.

In the present invention, in order to clean the side filter 251, which is installed on a side surface of the heat exchanger 250, using backwashing air, it is required to blow air from the outdoor air discharge unit 230 in the reverse direction. Therefore, when the blowing fan 232 of the outdoor air discharge unit 230 is operated to blow indoor air to the heat exchanger 250, the blowing fan 242 of the indoor air discharge unit 240 is also operated simultaneously therewith. Generally, in a conventional air-conditioning device, since the indoor air discharge unit 240 and the outdoor air introduction unit 210 are blocked from each other, the air in the outdoor air introduction unit 210 is not directly discharged to the indoor air discharge unit 240. However, the present invention is structured such that the air in the outdoor air introduction unit 210 is directly discharged to the indoor air discharge unit 240 through the dust discharge pipe 130, which causes the outdoor air introduction unit 210 and the indoor air discharge unit 240 to communicate with each other.

In this case, in order to increase the pressure at which dust is discharged, a damper 211*a* of the inlet 211 of the outdoor air introduction unit 210 and a damper 221*a* of the inlet 221 of the indoor air introduction unit 220 need to be in a closed state. Of course, a damper 242*a* of the indoor air discharge unit 240 and a damper 232*a* of the outdoor air discharge unit 230 need to be in an opened state.

To this end, it is preferable for the dampers 242*a* and 232*a* of the indoor air discharge unit 240 and the outdoor air discharge unit 230 to be respectively provided at the blowing fans 242 and 232. Of course, the dampers 242*a* and 232*a* may be respectively provided at inlets 241 and 231 of the indoor air discharge unit and the outdoor air discharge unit. These are components necessary for controlling the flow of air in the air-conditioning device.

While the present invention has been described hereinabove in connection with only a limited number of embodiments and drawings, the present invention is not limited thereto, and it should be understood that various changes and modifications may be made by an ordinary person skilled in the art within the spirit and scope of the invention and the appended claims and their equivalents.

DESCRIPTION OF REFERENCE NUMERALS

110: filter
111: opening
130: dust discharge pipe
140: valve

The invention claimed is:

1. An air-conditioning device having a dust removal function, comprising an outdoor air introduction unit configured to introduce outdoor air into a case, an outdoor air discharge unit comprising a blowing fan configured to supply outdoor air introduced through the outdoor air introduction unit to an indoor space, an indoor air introduction unit configured to introduce indoor air, and an indoor air discharge unit comprising a blowing fan configured to discharge indoor air introduced through the indoor air introduction unit to an outside, the air-conditioning device comprising:

a filter coupled to an inner side of an inlet of the outdoor air introduction unit to collect dust introduced along with outdoor air;
an opening formed in a lower end of a flange of the filter;
a dust-sweeping unit coupled to one side of the filter to sweep dust adhered to an inner surface of the filter; and
a dust discharge pipe comprising one end connected to the opening in the filter and an opposite end connected to the blowing fan installed in the indoor air discharge unit,
wherein the dust discharge pipe is provided at a middle portion thereof with a valve equipped with a motor so as to be opened and closed,
wherein the dust-sweeping unit comprises a flange, a frame extending from the flange to allow a motor to be installed thereto, a dust-collecting net attached to the frame, and a brush configured to be in contact with the dust-collecting net and to be rotated by the motor, and
wherein the dust-collecting net comprises a slit in which a concave groove portion is coupled, and a lower end of the concave groove portion communicates with the opening such that dust swept by the brush is discharged through the opening via the concave groove portion.

2. The air-conditioning device according to claim 1, wherein dampers are provided at inlets of the outdoor air introduction unit, the outdoor air discharge unit, the indoor air introduction unit, and the indoor air discharge unit such that a filter installed on a side surface of a heat exchanger is cleaned using backwashing air.

\* \* \* \* \*